(12) United States Patent
Bussard et al.

(10) Patent No.: US 7,064,839 B2
(45) Date of Patent: *Jun. 20, 2006

(54) OPTICAL PHASE STANDARD

(75) Inventors: Paul E Bussard, Santa Rosa, CA (US); Mark D Zinser, Vancouver, WA (US); James R Stimple, Santa Rosa, CA (US); Jeffrey Elmer Pape, Santa Rosa, CA (US)

(73) Assignee: Agilent Technologies Inc., Palo Alto, CA (US)

( * ) Notice: Subject to any disclaimer, the term of this patent is extended or adjusted under 35 U.S.C. 154(b) by 498 days.

This patent is subject to a terminal disclaimer.

(21) Appl. No.: 10/427,622

(22) Filed: Apr. 30, 2003

(65) Prior Publication Data

US 2004/0218188 A1   Nov. 4, 2004

(51) Int. Cl.
*G01B 9/02* (2006.01)

(52) U.S. Cl. .................................. 356/477

(58) Field of Classification Search .............. 356/73.1, 356/477; 385/12; 250/227.19, 227.27
See application file for complete search history.

(56) References Cited

U.S. PATENT DOCUMENTS 6,249,343 B1   6/2001 Wang et al.
6,788,424 B1 * 9/2004 Bussard et al. ............. 356/519
6,856,400 B1 * 2/2005 Froggatt ...................... 356/477

OTHER PUBLICATIONS

Sandel et al, Optical network analyzer applied for fiber Bragg grating characterization, Confrence Publication No. 448, Sep. 1997, pp. 186-189.*

* cited by examiner

*Primary Examiner*—Samuel A. Turner
(74) *Attorney, Agent, or Firm*—John L. Imperato

(57) ABSTRACT

An optical phase standard includes a coupler dividing an applied optical signal between a measurement interferometer and a frequency reference branch. Resulting signals at the outputs of the measurement interferometer and the frequency reference branch are sampled. The samples acquired at the output of the frequency reference branch are mapped to optical frequencies that are traceable to a frequency standard provided by an absorption cell. This mapping determines the optical frequencies at which the samples acquired are at the output of the measurement interferometer. From the acquired samples at the output of the measurement interferometer, phase characteristics of a device under test (DUT) are extracted. Aspects of the optical phase standard are alternatively implemented according to an optical phase standardization method.

16 Claims, 4 Drawing Sheets

OPTICAL PHASE STANDARD

BACKGROUND OF THE INVENTION

Interferometer-based systems are used to characterize relative group delay, chromatic dispersion, and other related phase parameters of optical devices under test (DUTs). For example, an AGILENT 81910A ALL PARAMETER TEST SOLUTION is an interferometer-based system that can measure relative group delay to an accuracy of ±50 femtoseconds. One factor that limits the accuracy of the measured phase parameters is uncertainty in determining the frequency of optical stimuli that are applied to the DUT. These frequency uncertainties, typically introduced by the tuneable optical source used to provide the optical stimuli, reduce traceability of phase measurements to measurement standards, in turn, reducing the accuracy with which the phase parameters of the DUT can be characterized. In view of this limitation and a market demand for more accurate measurements of phase parameters, there is a need to improve traceability of optical phase measurements to a standard so that phase parameters of a DUT can be measured with greater accuracy.

SUMMARY OF THE INVENTION

An optical phase standard constructed according to the embodiments of the present invention provides traceability of optical phase measurements of a DUT to a frequency standard. The optical phase standard includes a coupler dividing an applied optical signal between a measurement interferometer and a frequency reference branch. Resulting signals at the outputs of the measurement interferometer and the frequency reference branch are simultaneously sampled. The samples acquired at the output of the frequency reference branch are mapped to optical frequencies that are traceable to a frequency standard provided by an absorption cell. This mapping determines the optical frequencies at which the samples are acquired at the output of the measurement interferometer. From the acquired samples at the output of the measurement interferometer, phase characteristics for the DUT, such as dispersive fiber included in the optical phase standard, are extracted. Alternative embodiments of the present invention are directed toward an optical phase standardization method.

DETAILED DESCRIPTION

Features and aspects of the present invention are illuminated by an initial discussion of the operation of an optical phase measurement system 1. Although the term "frequency" is used throughout, it is understood that frequency and wavelength are interchangeable due to the inherent reciprocal relationship between frequency and wavelength.

Figure 1:
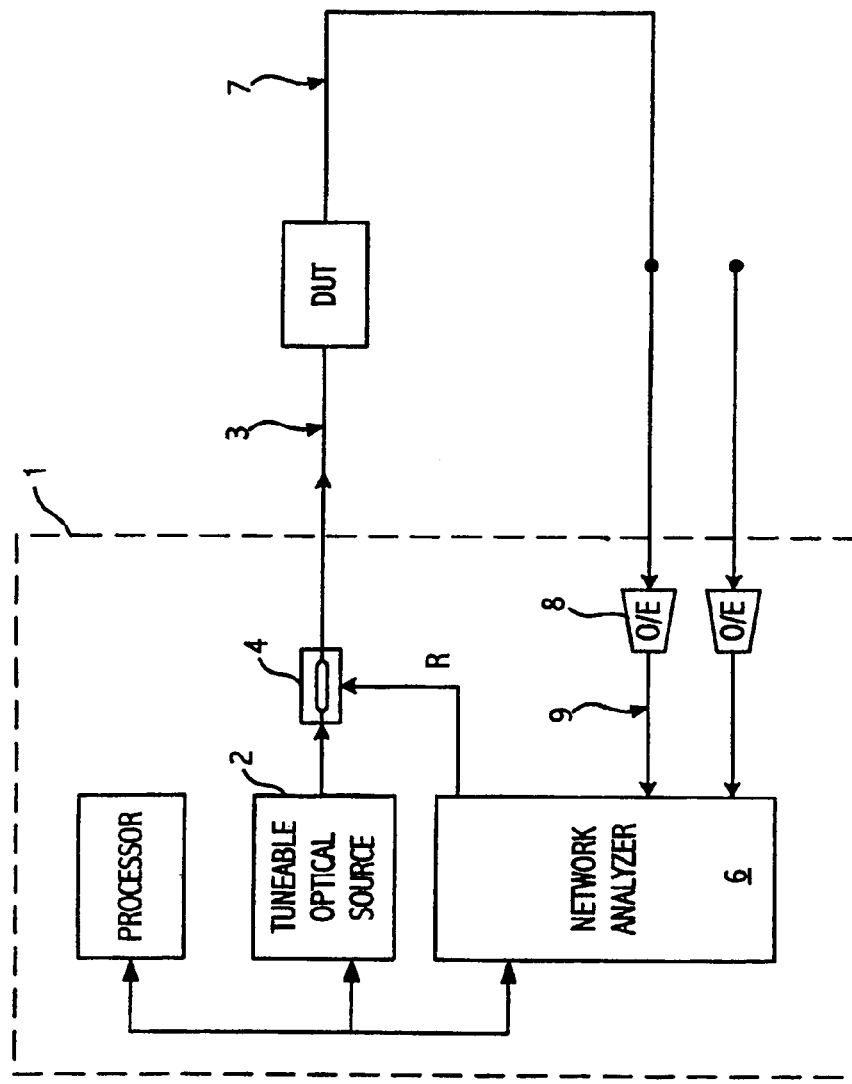
FIG. 1 shows an optical phase measurement system.

FIG. 1 shows an optical phase measurement system 1 wherein an intensity modulated optical signal 3 is applied to a DUT. The intensity modulated optical signal 3 is provided by a tuneable optical source 2, such as a tuneable laser source (TLS), cascaded with an AM (amplitude) modulator 4. Using the intensity modulated optical signal 3, phase parameters of the DUT are measured by a network analyzer 6 using the modulation phase shift method, as employed for example by an AGILENT TECHNOLOGIES, INC. 86038A OPTICAL DISPERSION ANALYZER, once the response signal 7 from the DUT is converted into an electrical signal 9 by an optical-to-electrical (O/E) converter 8. The accuracy of this type of phase measurement is limited by the accuracy with which the frequency of the intensity modulated optical signal 3 can be determined. This frequency accuracy, in turn, is limited by frequency uncertainties in the tuneable optical source 2 due to phase nonuniformities in the tuneable optical source 2 or dispersion of optical elements or transmission media in the optical transmission paths or DUT.

An optical phase standard 10 (shown in FIG. 2) constructed according to the embodiments of the present invention provides phase measurements of a DUT, such as dispersive fiber included in the optical phase standard, with traceability to a frequency standard. By comparing phase measurements of the DUT performed by the optical phase measurement system 1 of FIG. 1 using the modulation phase shift method with phase characteristics of the DUT determined using the optical phase standard 10, the optical phase measurement system 1 has traceability to the frequency standard as well.

The optical phase standard 10 includes a frequency reference branch 18 and a measurement interferometer 12 with a DUT path 14 and a reference path 16, that in one example are embedded in slits cut in open cell foam blocks to stabilize the operating environment and protect the optical phase standard 10 from thermal and mechanical disturbances.

A coupler 20 at an input I of the optical phase standard has one output 21 coupled to the measurement interferometer 12 and another output 23 coupled to the frequency reference branch 18. The output OUT1 of the measurement interferometer 12 is coupled to an amplitude detector A, and the output OUT2 of the frequency reference branch 18 is coupled to an amplitude detector B. In one embodiment, the amplitude detectors A, B are integrated into an optical phase measurement system 1 that includes a network analyzer 6 and O/E (optical-to-electrical) converters 22, 24. However, the AM modulator 4, while shown as part of the optical phase measurement system 1 and relied upon for phase measurements using the modulation phase shift method, is not relied upon to characterize the DUT when included in the optical phase standard 10. Hence, in characterizing the optical phase standard 1, the AM modulator 4 is typically bypassed or set to a low enough attenuation level to provide an optical signal 11 of sufficient amplitude or intensity. In an alternative embodiment, the amplitude detectors A, B are optical power meters, photodetectors or other broadband receivers that sample the amplitude or intensity of the resulting signals at the outputs OUT1, OUT2 of the measurement interferometer 12 and frequency reference branch 18 versus time, in response to a frequency sweep of the optical signal 11 provided to the coupler 20 by the tuneable optical source 2.

The amplitude detectors A, B simultaneously digitize, record, measure, or otherwise sample the optical signals 15, 17 at the outputs OUT 1, OUT2 of the measurement interferometer 12 and frequency reference branch 18, respectively. This simultaneous sampling results in the optical signals 17, 15 at the output OUT1 of the measurement interferometer 12 and at the output OUT2 of the frequency reference branch 18 being sampled at the same time, or being sampled wherein a known temporal relationship exists between the samples acquired at the output OUT1 and the samples acquired at the output OUT2, so that establishing the timing of samples acquired at the output OUT2 of the frequency reference branch 18 enables the timing of samples acquired at the output OUT1 of the measurement interferometer 12 to also be derived.

The amplitude detector B coupled to the frequency reference branch 18 maps sample positions, or indices i of the acquired samples to optical frequencies $\omega(i)$ within a frequency sweep of the tuneable optical source 2 that are referenced to a frequency standard provided by an absorption cell 26 in the frequency reference branch 18. Based on the simultaneity or otherwise known timing of the sample acquisitions by the amplitude detectors A, B, the mapped optical frequencies $\omega(i)$ are then used to establish the optical frequencies at which the samples at the output OUT1 of the measurement interferometer 12 are acquired. From the sample acquisitions at the output OUT1 of the measurement interferometer 12, phase parameters of the DUT within the optical phase standard 1 are extracted.

Mapping Sample Positions to Optical Frequencies in the Frequency Reference Branch The frequency reference branch 18 includes a splitter 28 coupled to the tuneable optical source 2, typically a tuneable laser source (TLS) via the coupler 20. The tuneable optical source 2, such as an AGILENT TECHNOLOGIES, INC. Model 81640B, is polarized, tuneable in optical frequency and provides the optical signal 11 to the splitter 28 through the coupler 20. The splitter 28 further divides the optical signal 11 between a reference path 30 and a delay path 32. The reference path 30 and the delay path 32 are recombined at a combiner 34. One output of splitter 28 is coupled to one input of the combiner 34 by a fiber 36, whereas the other output of splitter 28 is coupled to a second input of the combiner 34 by a fiber 38. In this example, the optical path length difference between the reference path 30 and the delay path 32 is 0.25 meters. However, other optical path length differences are alternatively employed.

Together, the splitter 28, the reference path 30, the delay path 32, and the combiner 34 form a Mach-Zehnder interferometer. As alternatives to the Mach-Zehnder interferometer, the frequency reference branch 18 includes a Fabry-Perot interferometer or other type of interferometer suitable for providing an interference pattern at the output of the combiner 34 based on relative phase differences between the reference path 30 and the delay path 32.

A sinusoidal interference pattern at the output of the interferometer of the frequency reference branch 18 results in a fringe signal 13. The fringe signal 13 may have insufficient contrast when the relative polarizations of the optical signals 11a, 11b combined at the output of the coupler 34 are orthogonal, being that the contrast of the fringe signal 13 generally decreases as the relative polarization of the optical signals 11a, 11b approaches ninety degrees and generally increases as the polarizations of the optical signals 11a, 11b become more aligned. In the example where the interferometer is a Mach-Zehnder interferometer as shown, relative polarization is adjusted via the mounting of the fibers 36, 38. The relative polarization of the optical signals can be maintained by implementing the splitter 28 and the combiner 34 using polarization-maintaining couplers and by implementing the fibers 36, 38 using polarization-maintaining fibers. To prevent the intensity of a composite signal 15 at the output OUT2 of the cascade of the interferometer and the absorption cell 26 from dropping below a predesignated minimum intensity, the coupling ratio of the splitter 28 and/or combiner 34 are typically staggered, for example at 10% and 90% coupling ratios between the reference path 30 and the delay path 32.

Figure 2:
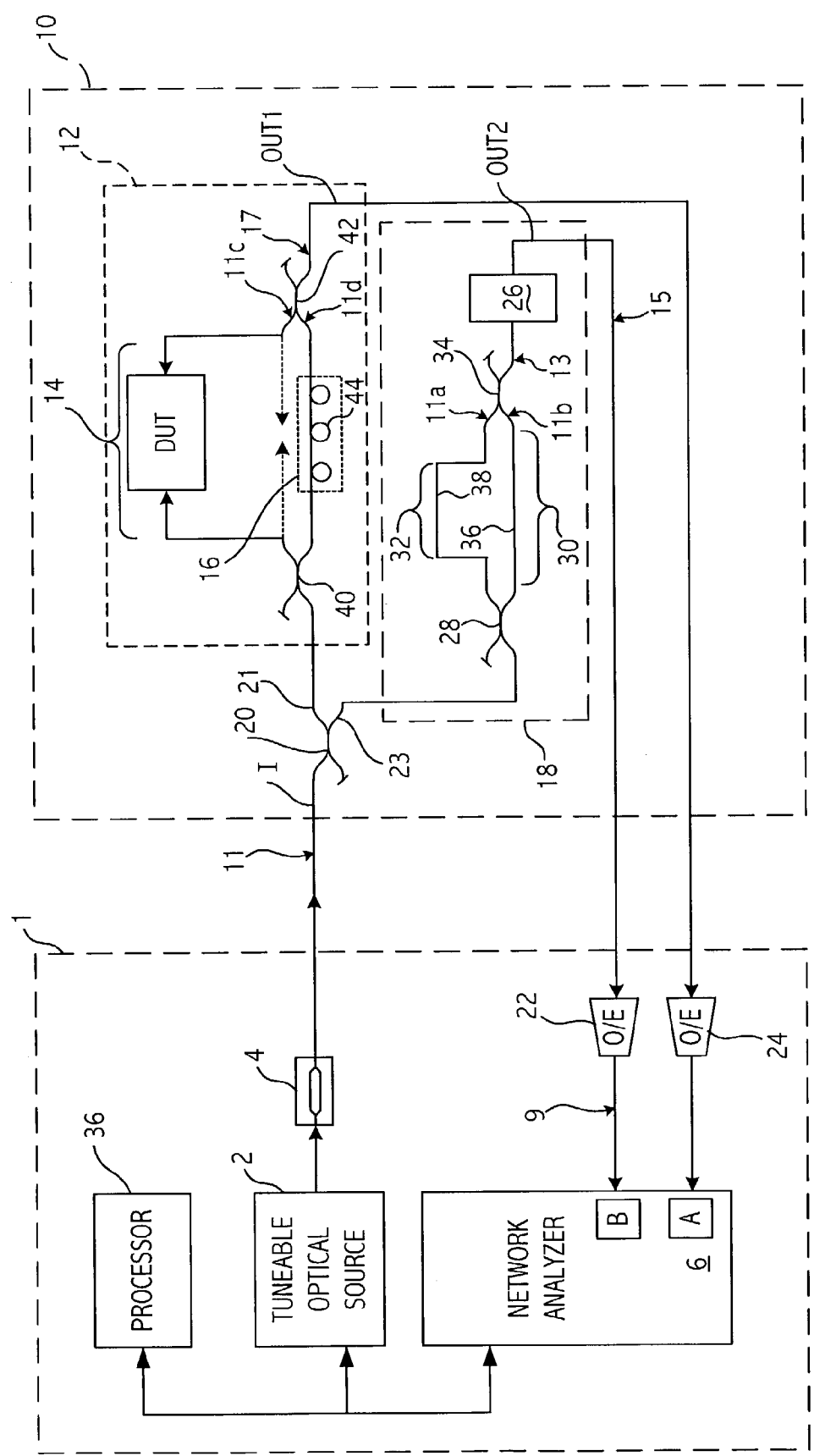
FIG. 2 shows an optical phase standard constructed according to alternative embodiments of the present invention.

In the frequency reference branch 18, the absorption cell 26 is cascaded with the interferometer in a series arrangement at the output of the interferometer as shown in FIG. 2, or in a series arrangement between the tuneable optical source 2 and the splitter 28 (not shown). The absorption cell 26 typically includes one or more gas cells that contain one or more gases, such as acetylene, methane, or hydrogen cyanide, and provides optical absorption lines 19 (shown in FIG. 3) at frequencies W(i) that are spaced over a broad frequency range. In one implementation of the frequency reference branch 18, the interferometer is a Fabry-Perot interferometer, such as a JDS UNIPHASE WVL-2B10 BROADBAND WAVELENGTH LOCKER, and the cascade of the interferometer and the absorption cell 26 includes the Fabry-Perot interferometer enclosed within the absorption cell 26.

The absorption lines 19 are stable over time and stable over a variety of environmental conditions, making the absorption cell 26 a well-suited frequency standard. Characteristics of suitable absorption cells 26 are known in the art and are illustrated for example in U.S. Pat. No. 6,249,343 B1 to Wang et al.

Figure 3:
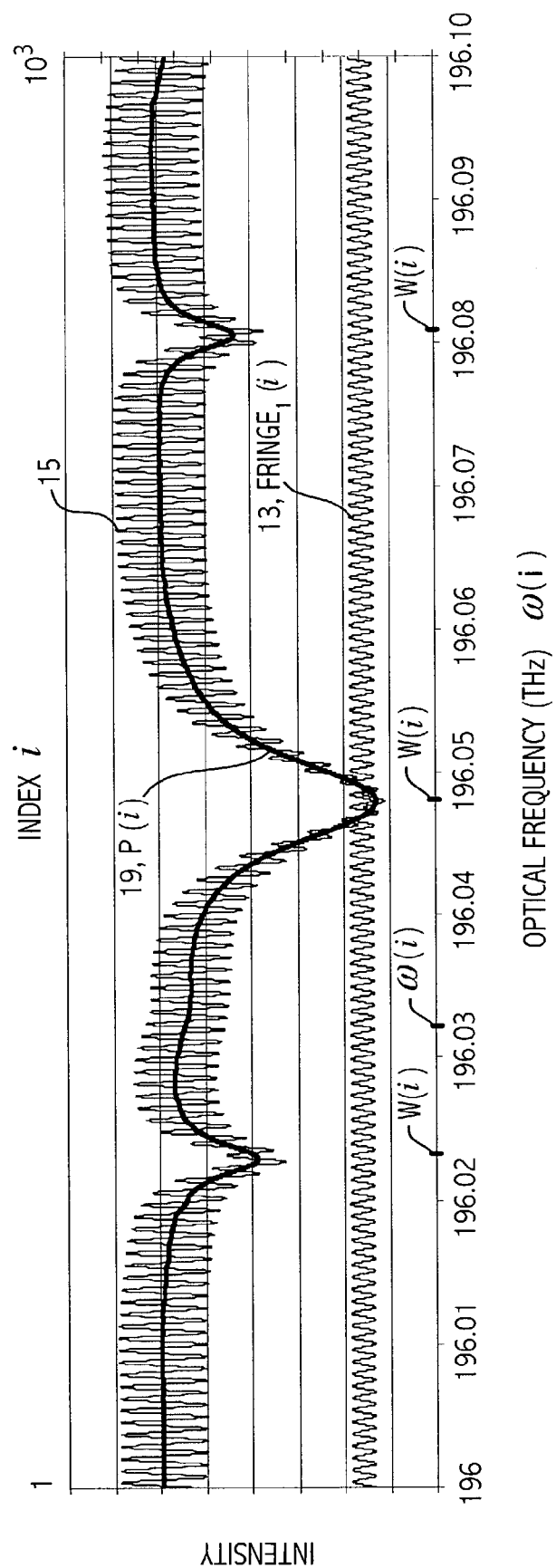
FIG. 3 shows exemplary signals provided by a frequency reference branch included in the optical phase standard of FIG. 2.

In response to the optical signal 11 applied to the frequency reference branch 18, the cascaded arrangement of the interferometer and the absorption cell 26 provides the composite signal 15 that includes a superposition of the fringe signal 13 provided by the interferometer and the absorption lines 19 provided by the absorption cell 26 as shown in the exemplary plots of FIG. 3. The composite signal 15 is applied to the amplitude detector B.

The amplitude detector B samples the composite signal 15 over time, where positions of the samples in time are represented by sample position, number, or index i. A processor 36 is within the network analyzer 6, or is otherwise associated with the amplitude detector B. The processor 36 uses this sampled representation of the composite signal 15 to map the sample indices i to optical frequencies $\omega(i)$ within the frequency sweep of the optical signal 11. When the tuneable optical source 2 providing the optical signal 11 does not have consistent or repeatable frequency sweep characteristics, or when performance characteristics of optical components in the optical transmission path are time-varying, sampling the composite signal 15 over a single frequency sweep of the optical signal 11 is advantageous.

The mapping between optical frequencies $\omega(i)$ and the sample positions, or indices i, includes filtering or otherwise isolating the sampled representation of the composite signal 15 to separate samples representing the fringe signal 13 from samples representing the absorption lines 19. This isolation is conveniently performed using a digital filter, being that the fringe signal 13 is sinusoidal and is readily separable from the spectral characteristics of the absorption lines 19 and the sampled representation of the composite signal 15 is typically in digital form. This isolation results in a sampled representation $P(i)$ of the absorption lines 19 and a sampled representation $FRINGE_1(i)$ of the fringe signal 13 as shown in FIG. 3.

The frequencies of predesignated ones of the absorption lines 19 are then identified, typically by identifying magnitude minima or notches in the sampled representation P(i) of the absorption lines 19 based on center of mass calculations, or curve fitting techniques applied to the sampled representation P(i). This results in an accurate mapping of sample positions i that are proximate to the absorption lines 19 to the optical frequencies W(i) of the absorption lines 19. For example, where the absorption cell 26 includes one gas cell containing Acetylene ($^{12}C_2H_2$) and Methane ($CH_4$), and another gas cell containing Hydrogen Cyanide ($H^{13}C^{14}N$), a center of mass of a magnitude minimum that is within 3.75 GHz of an absorption line is associated with the known frequency of the absorption line. In this example, where the absorption lines 19 span the optical frequency range of 183.0416 THz to 198.1181 THz with 76 points, sample positions i proximate to the absorption lines 19 in the sampled representation P(i) are mapped to the optical frequencies W(i) of the absorption lines 19 with an uncertainty of less than +/−75 MHz.

The sampled representation $FRINGE_1(i)$ of the fringe signal 13 represents the cyclical interference pattern of the fringe signal 13. The fringe signal 13 has slight frequency deviations, due to dispersion of optical elements or transmission media in the optical transmission paths of the frequency reference branch 18, that are accommodated for in the mapping of sample positions i to optical frequencies $\omega(i)$.

In one example, the sample positions i are mapped to the corresponding optical frequencies $\omega(i)$ by counting the number of cycles, or fringes, in the sampled representation $FRINGE_1(i)$ that occur between the identified frequencies of the predesignated absorption lines 19. Interpolation based on the number of cycles that occur between the identified optical frequencies W(i) at the sample points proximate to the identified absorption lines 19 provides the corresponding optical frequencies $\omega(i)$ to the sample numbers i that lie between the identified optical frequencies W(i).

In another example, corresponding phases, represented as an accumulated phase $\phi(i)$, are assigned to the sample positions i in the sampled representation $FRINGE_1(i)$ of the fringe signal 13 on the basis that each cycle of the interference pattern results in a phase increase of $2\pi$ radians. Then, interpolation based on a piecewise linear representation of the accumulated phase $\phi(i)$ versus the identified optical frequencies W(i) is used to map each sample number i to the corresponding optical frequency $\omega(i)$ within the frequency sweep of the optical signal 11.

In yet another example, interpolation is based on a curve fit of the accumulated phase $\phi(i)$ to the optical frequencies W(i). Then, each sample position i is mapped to a corresponding optical frequency $\omega(i)$ within the frequency sweep of the optical signal 11 based on the curve fit. When sufficient degrees of freedom are provided in the curve fit, for example by using a sufficiently high order polynomial in the example of a polynomial curve fit, this approach accommodates phase nonlinearities that result from dispersion or other phase nonlinearities of the tuneable optical source 2. Regardless of the approach used, a mapping of sample positions i to corresponding optical frequencies $\omega(i)$ within the frequency sweep of the optical signal 11 is provided by the frequency reference branch 18 of the optical phase standard 10.

Determining Phase Characteristics of the Optical Phase Measurement Standard

Samples are simultaneously acquired at the output OUT2 of the frequency reference branch 18 and at the output OUT1 of the measurement interferometer 12. Whereas the samples acquired at the output OUT2 of the frequency reference branch 18 are used to map optical frequencies $\omega(i)$ to the sample positions i of the acquired samples at the output OUT2, the samples acquired at the output OUT1 of the measurement interferometer 12 are used to extract the phase characteristics of the DUT at optical frequencies $\omega(i)$ established by the mapping.

The coupler 20 divides the optical signal 11 between the measurement interferometer 12 and the frequency reference branch 18. The output 21 of the coupler 20 is connected to the measurement interferometer 12 through a splitter 40. At the splitter 40, the optical signal is further divided between the reference path 16 and the DUT path 14 and recombined at combiner 42.

The reference path 16 of the measurement interferometer 12 includes a polarization adjuster 44 coupled between the splitter 40 and combiner 42. In a normalizing configuration, a designated length of fiber is connected between the splitter 40 and the combiner 42 in the DUT path 14, in place of the DUT. In a DUT configuration, the DUT is connected between the splitter 40 and the combiner 42 in the DUT path 14.

The polarization adjuster 44 is adjusted to optimize the polarization alignment of the signals joined at combiner 42 to produce an interference pattern 17 at the output OUT1 of the measurement interferometer 12 that varies cyclically according to the relative phases of the optical signals 11c, 11d of the DUT path 14 and the reference path 16. This polarization adjustment prevents the polarization of the optical signals 11c, 11d from being orthogonal, which may result in insufficient contrast in the interference pattern 17. To provide sufficient contrast, the polarization adjuster 44 is typically readjusted when changing between the normalizing configuration and DUT configuration of the measurement interferometer 12.

The interference pattern 17 sampled by the amplitude detector A is represented by a sampled fringe signal $FRINGE_2(i)$. An accumulated phase is assigned to the sample positions i in the sampled representation $FRINGE_2(i)$ on the basis that each cycle of the interference pattern 17 results in a phase increase of $2\pi$ radians. With the optical phase standard 10 in the normalizing configuration, a first phase $\phi_1(\omega)$ is measured versus optical frequency $\omega$. With the optical phase standard in the DUT configuration, a second phase $\phi_2(\omega)$ is measured versus optical frequency $\omega$, where the frequencies $\omega$ are established from the mapping between the sample positions i and the optical frequencies $\omega(i)$. The phase $\phi_1(\omega)$ is subtracted from the phase $\phi_2(\omega)$ in the DUT configuration to give the phase $\phi_{DUT}(\omega)$ of the DUT versus optical frequency $\omega$. This subtraction normalizes, or otherwise removes, influences in the optical phase standard 10 that are outside the DUT.

Based on the normalization, the phase $\phi_{DUT}(\omega)$ of the DUT equals $\phi_2(\omega)-\phi_1(\omega)$. The absolute group delay, $\tau_{gDUT}(\omega)$, is given by the derivative of phase with respect to optical frequency according to the relationship: $\tau_{gDUT}(\omega)=-d[\phi_{mDUT}(\omega)]/d\omega$. In one example, the derivative is determined by curve fitting the phase $\phi_{DUT}(\omega)$ of the DUT to optical frequencies. Then, the analytical expression provided by the curve fit is differentiated. Alternatively, the derivative is provided numerically or according to other suitable techniques.

The relative group delay $RGD(\omega 1,\omega 2)$ at optical frequency $\omega 2$ relative to optical frequency $\omega 1$ is given by the difference in absolute group delay between the two frequencies according to the relationship: $RGD(\omega 1,\omega 2)=\tau_{gDUT}(\omega 2)-\tau_{gDUT}(\omega 1)$. In one example, the group delay $RGD(\omega_\Theta, \omega_\theta)$ of the DUT between 183.023 THz and 200.530 THz is measured with an uncertainty of +/−5 fs when the nominal value of relative group delay is 5 ps. Absolute group delay $\tau_{gDUT}(\omega)$ and relative group delay $RGD(\omega 1,\omega 2)$ are examples of phase parameters of the DUT extracted from the measurement interferometer 12. It is appreciated that chromatic dispersion, and other related phase parameters of the DUT are alternatively extracted from the accumulated phase $\phi_{DUT}(\omega)$ of the DUT, where the optical frequency is traceable to the frequency standard provided by the absorption cell 26 of the frequency reference branch 18.

The rate at which samples are acquired by the amplitude detectors A, B and differences in optical path lengths within the measurement interferometer 12 and frequency reference branch 18 are chosen to provide sufficient resolution in the extracted phase parameters and the frequency mapping between the sample positions i and the optical frequencies $\omega(i)$. In one example, the normalizing configuration of the measurement interferometer 12 introduces an optical path length difference $\delta_1$ of 1 m between the DUT path 14 and the reference path 16. Using an estimate of the index of refraction, n=1.47, the frequency F1 of the cycles of the interference pattern 17 versus optical frequency at the output of the measurement interferometer 12 is approximately:

$$F1 = \frac{c}{n\delta_1} = \frac{299{,}792{,}458 \text{ m/s}}{(1.47)*(1\text{ m})} = 203.9 \text{ MHz}.$$

With the DUT configuration of the measurement interferometer 12 introducing an optical path length difference $\delta_2$ of 1.34 m between the DUT path 14 and the reference path 16, the frequency F2 of the cycles of the interference pattern 17 versus optical frequency at the output OUT1 of the measurement interferometer 12 is approximately:

$$F2 = \frac{c}{n\delta_2} = \frac{299{,}792{,}458 \text{ m/s}}{(1.47)*(1.34\text{ m})} = 152.2 \text{ MHz}$$

With an optical path length difference $\delta_3$ of 0.25 m in the frequency reference branch 18, the frequency F3 of the cycles of the interference pattern 17 versus optical frequency at the output OUT2 of the frequency reference branch 18 is approximately:

$$F3 = \frac{c}{n\delta_3} = \frac{299{,}792{,}458 \text{ m/s}}{(1.47)*(0.25\text{ m})} = 815.8 \text{ MHz}$$

When the amplitude detectors A, B sample the outputs OUT1, OUT2 of the measurement interferometer 12 and the reference branch 18, respectively, in intervals of 15.625 MHz at a rate of 1.8 kSa/s, approximately 13 samples per cycle of the interference pattern 17 result in the normalizing configuration, 10 samples per cycle of the interference pattern 17 result in the DUT configuration, and 52 samples per cycle of the fringe signal 13 result in the frequency reference branch 18, providing sufficient resolution in the extracted phase parameters of the DUT and in the frequency mapping between the sample positions i and the optical frequencies $\omega(i)$.

Figure 4:
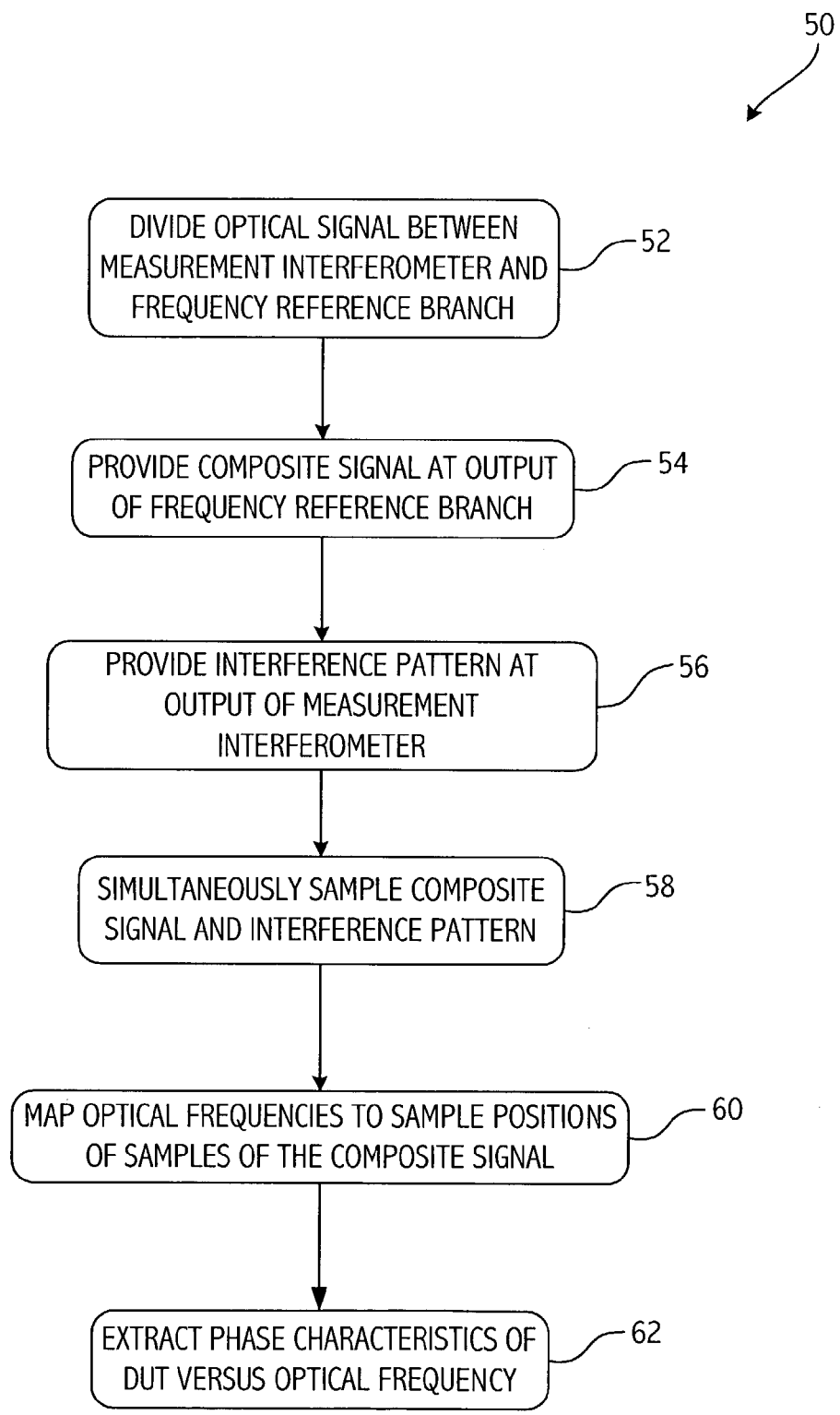
FIG. 4 shows a flow diagram of an optical phase standardization method constructed according to alternative embodiments of the present invention.

Alternative embodiments of the present invention are directed toward an optical phase standardization method 50, shown in the flow diagram of FIG. 4. The method 50 includes dividing the optical signal 11 between the measurement interferometer 12 and a frequency reference branch 18 (step 52). In response to the optical signal 11, the composite signal 15, including a superposition of the cyclical fringe signal 13 and the series of absorption lines 19, is provided at an output OUT2 of the frequency reference branch 18 (step 54). The interference pattern 17 representing phase characteristics of a DUT at the output OUT1 of the measurement interferometer 12 is provided in response to the optical signal 11 (step 56). This step typically includes subtracting the phase characteristic $\phi_1(\omega)$ acquired in a normalizing configuration of the measurement interferometer 12 from the phase characteristic $\phi_2(\omega)$ in the measurement configuration of the measurement interferometer 18.

The composite signal 15 and the interference pattern 17 are simultaneously sampled in step 58. In step 60, optical frequencies $\omega(i)$ are mapped to sample positions i of the samples of the composite signal 15 based on a determined number of cycles of the fringe signal 13 and the identified optical frequencies W(i) of predesignated absorption lines 19 in the series. This mapping is then used to extract the phase characteristics $\phi_{DUT}(\omega)$ of the DUT versus optical frequency $\omega$ (step 62).

While the embodiments of the present invention have been illustrated in detail, it should be apparent that modifications and adaptations to these embodiments may occur to one skilled in the art without departing from the scope of the present invention as set forth in the following claims.

The invention claimed is:

1. An optical phase standard, comprising:
    a measurement interferometer including a measurement path and a reference path coupled between a splitter and a combiner;
    a frequency reference branch including an interferometer cascaded with an absorption cell; and
    a coupler having an input, a first output coupled to the measurement interferometer, and a second output coupled to the frequency reference branch.

2. The optical phase standard of claim 1 wherein the frequency reference branch provides a composite signal in response to an optical signal applied to the input of the coupler, the composite signal including a superposition of a cyclical fringe signal and a series of absorption lines.

3. The optical phase standard of claim 2 wherein the measurement interferometer provides a cyclical interference pattern representing phase characteristics of a DUT relative to the reference path in response to one or more frequency sweeps of an optical signal provided by a tuneable optical source.

4. The optical phase standard of claim 3 wherein an output of the measurement interferometer is coupled to a first amplitude detector acquiring samples of the interference pattern, and an output of the frequency reference branch is coupled to a second amplitude detector acquiring samples of the composite signal, the samples acquired by the first amplitude detector and the second amplitude detector being simultaneously acquired.

5. An optical phase standard, comprising:
a measurement interferometer including a measurement path configurable for normalizing and for measurement of a device under test (DUT), and a reference path coupled between a splitter and a combiner;
a frequency reference branch including an interferometer cascaded with an absorption cell; and
a coupler having an input, a first output coupled to the measurement interferometer, and a second output coupled to the frequency reference branch.

6. The optical phase standard of claim 5 wherein the frequency reference branch provides a composite signal in response to an optical signal applied to the input of the coupler, the composite signal including a superposition of a cyclical fringe signal and a series of absorption lines.

7. The optical phase standard of claim 5 wherein the measurement interferometer provides a cyclical interference pattern representing phase characteristics of the DUT relative to the reference path in response to one or more frequency sweeps of an optical signal provided by a tuneable optical source.

8. The optical phase standard of claim 6 wherein the measurement interferometer provides a cyclical interference pattern representing phase characteristics of the DUT relative to the reference path in response to one or more frequency sweeps of an optical signal provided by a tuneable optical source.

9. The optical phase standard of claim 8 wherein an output of the measurement interferometer is coupled to a first amplitude detector acquiring samples of the interference pattern, and an output of the frequency reference branch is coupled to a second amplitude detector acquiring samples of the composite signal, the samples acquired by the first amplitude detector and the second amplitude detector being simultaneously acquired.

10. An optical phase standard, comprising:
a measurement interferometer including a DUT path and a reference path coupled between a splitter and a combiner;
a frequency reference branch; and
a coupler having an input receiving one or more frequency sweeps of an optical signal, a first output coupled to the measurement interferometer, and a second output coupled to the frequency reference branch, the measurement interferometer providing an interference pattern in response to the optical signal and the frequency reference branch providing a composite signal in response to the optical signal.

11. The optical phase standard of claim 10 wherein the composite signal includes a superposition of a cyclical fringe signal and a series of absorption lines.

12. The optical phase standard of claim 11 wherein the interference pattern represents relative phase differences introduced between the DUT path and the reference path.

13. The optical phase standard of claim 10 wherein the interference pattern represents relative phase differences introduced between the DUT path and the reference path.

14. The optical phase standard of claim 10 wherein an output of the measurement interferometer is coupled to a first amplitude detector and an output of the frequency reference branch is coupled to a second amplitude detector.

15. An optical phase standardization method, comprising:
dividing an optical signal between a measurement interferometer and a frequency reference branch;
providing a composite signal that includes a superposition of a cyclical fringe signal and a series of absorption lines at an output of the frequency reference branch in response to the optical signal;
providing an interference pattern representing phase characteristics of a DUT at an output of the measurement interferometer in response to the optical signal;
simultaneously sampling the composite signal and the interference pattern;
mapping corresponding optical frequencies to sample positions of the samples of the composite signal based on a determined number of cycles of the fringe signal and identified optical frequencies of predesignated absorption lines in the series; and
using the mapping to extract the phase characteristics of the DUT versus optical frequency.

16. The optical phase standardization method of claim 15 wherein providing the interference pattern representing phase characteristics of a DUT includes subtracting a first phase characteristic in a normalizing configuration of the measurement interferometer from a second phase characteristic in a measurement configuration of the measurement interferometer.

* * * * *

UNITED STATES PATENT AND TRADEMARK OFFICE
CERTIFICATE OF CORRECTION

PATENT NO. : 7,064,839 B2
APPLICATION NO. : 10/427622
DATED : June 20, 2006
INVENTOR(S) : Bussard et al.

It is certified that error appears in the above-identified patent and that said Letters Patent is hereby corrected as shown below:

On the Title page, in field (56), under "Other Publications", in column 2, line 1, delete "al," and insert -- al., --, therefor.

On the Title Pge, in field (56), under "Other Publications", in column 2, line 2, delete "Confrence" and insert -- Conference --, therefor.

Signed and Sealed this

Twenty-first Day of November, 2006

JON W. DUDAS
*Director of the United States Patent and Trademark Office*